United States Patent
Ward (10) Patent No.: US 6,446,944 B1
(45) Date of Patent: Sep. 10, 2002

(54) SUSPENSION STRUT

(75) Inventor: Michael C. Ward, Brampton (CA)

(73) Assignee: General Kinetics Engineering Corporation, Brampton (CA)

(*) Notice: Subject to any disclaimer, the term of this patent is extended or adjusted under 35 U.S.C. 154(b) by 0 days.

(21) Appl. No.: 09/920,960

(22) Filed: Aug. 3, 2001

Related U.S. Application Data (60) Provisional application No. 60/224,510, filed on Aug. 14, 2000.

(51) Int. Cl.[7] .................................................. F16F 9/53
(52) U.S. Cl. ...................... 267/128; 267/64.26; 188/286
(58) Field of Search ........................... 267/64.26, 64.11, 267/120, 127; 188/286, 287

(56) References Cited

U.S. PATENT DOCUMENTS 2,735,670 A * 2/1956 Scholtze ..................... 268/128
3,804,216 A * 4/1974 Katsumori et al. ......... 188/286

* cited by examiner

Primary Examiner—Matthew C. Graham
(74) Attorney, Agent, or Firm—Bereskin & Parr (57) ABSTRACT

A suspension strut having a piston tube containing a floating piston, slidable within a cylinder tube. A collar is fixed to the inner surface of the cylinder tube and contains a tapered wear ring. As the strut expands by extending the piston tube relative to the cylinder tube, the tapered wear band slides over valve orifices in the outer surface of the piston tube, gradually cutting off fluid flow from the annular space between the two tubes into an end cavity of the strut, thus increasing damping and reducing the likelihood of metal to metal contact at full strut extension. This reduces shock loads on the strut for smoother vehicle operation and increased component life.

13 Claims, 6 Drawing Sheets

SUSPENSION STRUT

PRIOR APPLICATION

This application claims the benefit of U.S. Provisional Application Ser. No. 60/224,510, filed Aug. 14, 2000 entitled "SUSPENSION STRUT".

FIELD OF THE INVENTION

This invention relates to a hydraulic suspension strut for use in heavy vehicles.

BACKGROUND OF THE INVENTION

Suspension struts are used in many types of vehicles to absorb and dampen transient forces that a vehicle is subjected to as it travels over terrain. In a typical suspension strut, there are a plurality of cavities that contain a viscous fluid such as hydraulic fluid (oil). As the strut is compressed, fluid is allowed to flow between the cavities through orifices of varying sizes. The viscous fluid flowing through the orifices provides damping within the strut. The amount of damping within the strut can be adapted to the types of transient loads expected by increasing or decreasing the diameters of the orifices through which the fluid flows and by changing the viscosity of the fluid itself.

It is known in the art that as a suspension strut reaches its full extension, harmful metal to metal contact may occur between the piston and piston guide in addition to large spike loads being transferred to the vehicle at the strut attachment points. This situation results in unnecessary component wear which will decrease the operating life of the strut. To avoid this situation, it is known in the art to increase the damping within the strut to slow the rate of expansion as the strut nears full extension. For this purpose, mechanical rebound stops are sometimes provided which are attached to the outside of the piston rod and contractible within the rod guide.

Generally, mechanical rebound stops consist of a resilient bumper or a piston/chamber arrangement. As the bumper compresses, it absorbs energy that would otherwise be dissipated by the contact of metal components within the strut thus avoiding unnecessary wear. The bumpers are inexpensive but have limited energy storage/dissipation ability. The piston/chamber arrangement relies on expensive machining and surface treatment processes to achieve higher levels of energy dissipation, and is not cost-effective.

BRIEF SUMMARY OF THE INVENTION

This invention in a preferred embodiment provides a hydraulic strut which can be made in a relatively inexpensive manner and has a sliding seal that can increase the damping rate within the strut as the strut approaches full extension.

In one aspect the invention provides a suspension strut comprising:

(a) an outer cylinder having an inner surface;
(b) an inner cylinder defining a first space therein, said inner cylinder being slidable in said outer cylinder and defining an annular second space between said inner cylinder and said outer cylinder;
(c) said inner cylinder including a cap assembly defining a third space between said cap assembly and said outer cylinder;
(d) at least one valve on said inner cylinder to permit fluid flow between said annular second space and said third space; and
(e) a shutoff attached to the inner surface of said outer cylinder and cooperating with said valve to effect a gradual shutoff of fluid flow from said annular second space through said valve to said third space as said inner and outer cylinders are extended with respect to each other.

Further aspects and advantages of the invention will appear from the following disclosure, taken together with the accompanying drawings.

DETAILED DESCRIPTION OF PREFERRED EMBODIMENTS

Figure 1:
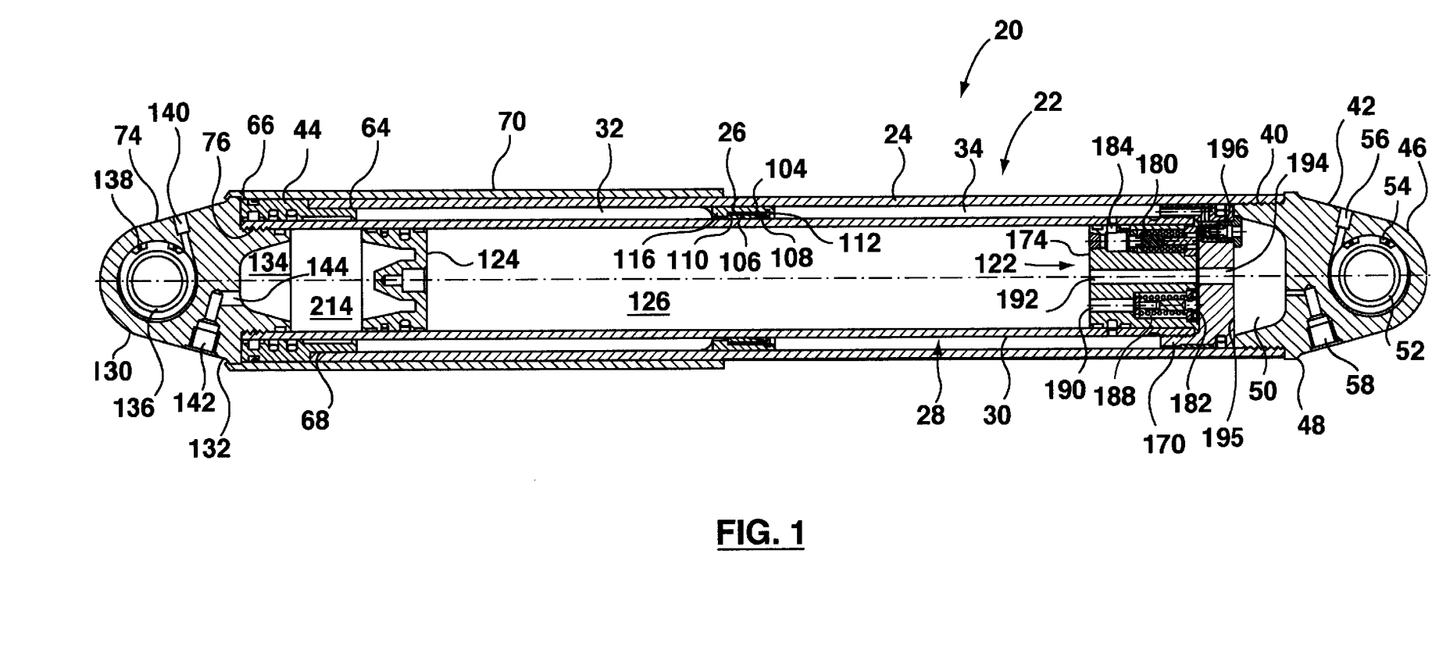
FIG. 1 is a cross sectional view of a suspension strut according to the invention, in full compression.

Reference is first made to FIG. 1, which shows a suspension strut 20 according to the invention. Suspension strut 20 includes an outer cylinder assembly, shown generally at 22, having a cylinder tube 24 and an annular collar 26 welded to the inner surface of cylinder 24. Strut 20 also includes a piston tube assembly 28 having a piston tube 30 which is axially received in cylinder tube 24 and can slide axially therein, with a clearance between the piston and cylinder tubes 24, 30. The clearance between these tubes is divided by the collar 26 into a first annular cavity 32 to the left (as drawn) of collar 26, and a second annular cavity 34 to the right (as drawn) of collar 26.

Cylinder tube 24 is connected at its right-hand end (as drawn), by thread 40, to a cylinder head 42. The other end of cylinder tube 24 is welded to an end ring 44.

Cylinder head 42 includes an outer end 46 and an inner end 48. Located at the inner end of cylinder head 42 is a bowl-shaped cavity 50, positioned centrally within the cylinder head 42. Located near the outer end 46 of cylinder head 42 is a pivot bearing 52 which typically receives an axle from a road arm assembly (not shown). Bearing 52 is slidably received in cylinder head 42 and is held in place with locking rings 54 as is commonly known in the art. A bored hole 56 which extends to the exterior of cylinder head 42 from bearing 52 allows grease to be pumped into the bearing for lubrication purposes as required.

Also located within cylinder head 42 is a vent plug 58 which is used primarily during the manufacturing phase, to bleed air from the interior of the suspension strut. The vent plug 58 communicates with the interior of suspension strut 20 via cavity 50.

As mentioned, one end of cylinder tube 24 is welded to end ring 44. End ring 44 has an axially inner end 64 and an axially outer end 66. The axially inner end 64 of the end ring includes a recess 68 in its outer surface, which recess has a depth equal to the thickness of the wall of cylinder tube 24. The cylinder tube 24 is slid over the recess 50 and is then welded in position on the end ring 44. When the two components are welded together, the outer radial surface of the axially outer end 66 of end ring 44, and the outer radial surface of cylinder tube 24, are axially aligned and together form a smooth, continuous surface.

The cylinder tube 24 is covered over part of its length by a cylindrical protection tube 70. The protection tube 70 is mounted to the outer radial edge of a piston tube head 74 assembly, which is in turn connected to the piston tube 30 by thread 76. The protection tube 70 acts as a shield to reduce the likelihood of debris entering the interior of the suspension strut 20.

The axially outer end 66 of end ring 44 includes (see FIG. 3) an annular channel 78 on its outer radial surface which receives an annular scraper 80. The scraper 80 prevents debris from entering the interior of the suspension strut 20 between the protection tube 70 and end ring 44.

The inner radial surface of end ring 44 includes annular channels 82, 84, 86 and 88. Channel 82 contains an excluder seal 89 which prevents contaminants from being dragged into contact with the working fluid. Channels 84, 86 contain O-ring seals 90, 92 which bias step seals 94, 96 radially inwardly as shown in FIG. 1. These seals prevent high pressure fluid located in annular cavity 32 from escaping from the suspension strut by travelling between the inner radial surface of end ring 44 and the outer radial surface of piston tube 30.

Located within channel 88 is a guide ring 98 which can be made of Teflon™ or nylon or any other suitable material. Guide ring 98 helps to provide a smooth axial movement of piston tube 30 within cylinder tube 24.

Annular collar 26 (see also FIG. 5) includes an annular channel 104 in its inner radial surface. Channel 104, which is open at one end, receives a floating wear band 106 which can typically be made from any suitable material, e.g. suitable grades of steel, aluminum, brass or plastic. Wear band 106 has a tapered end 108 and a thick end 110. At the tapered end 108, the radially inner surface of wear band 106 tapers radially outwardly, as shown.

Figure 5:
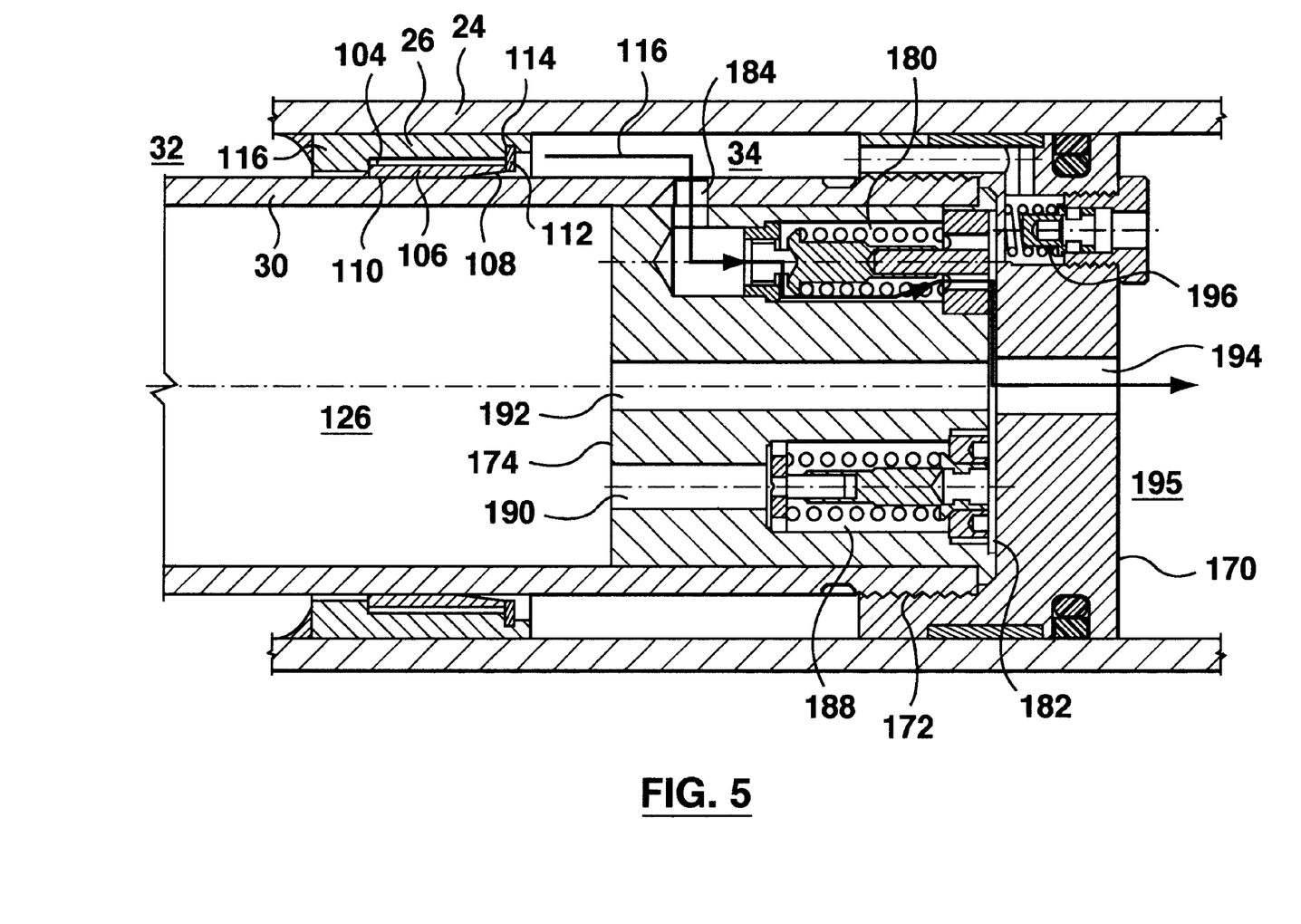
FIG. 5 is a partial cross sectional view of the FIG. 1 suspension strut showing a fluid path as the strut extends.

The wear band 106 is held within the channel 104 by a retaining ring 112 at the open end of channel 104. The retaining ring 112 rests in a second annular channel 114 which is deeper than channel 104. At the other end of collar 26, end wall 116 of the annular collar holds the wear band 106 in channel 104.

Annular collar 26 is dimensioned so that its inner diameter is slightly larger than the outer diameter of piston tube 30, providing a clearance between annular collar 26 and piston tube 30. However, the clearance is largely sealed by the wear band 106, which nevertheless allows a small amount of fluid flow between annular cavities 32, 34, so that in use, there will be fluid (e.g. hydraulic fluid) in cavity 32 to improve heat dissipation in the strut.

Figure 2:
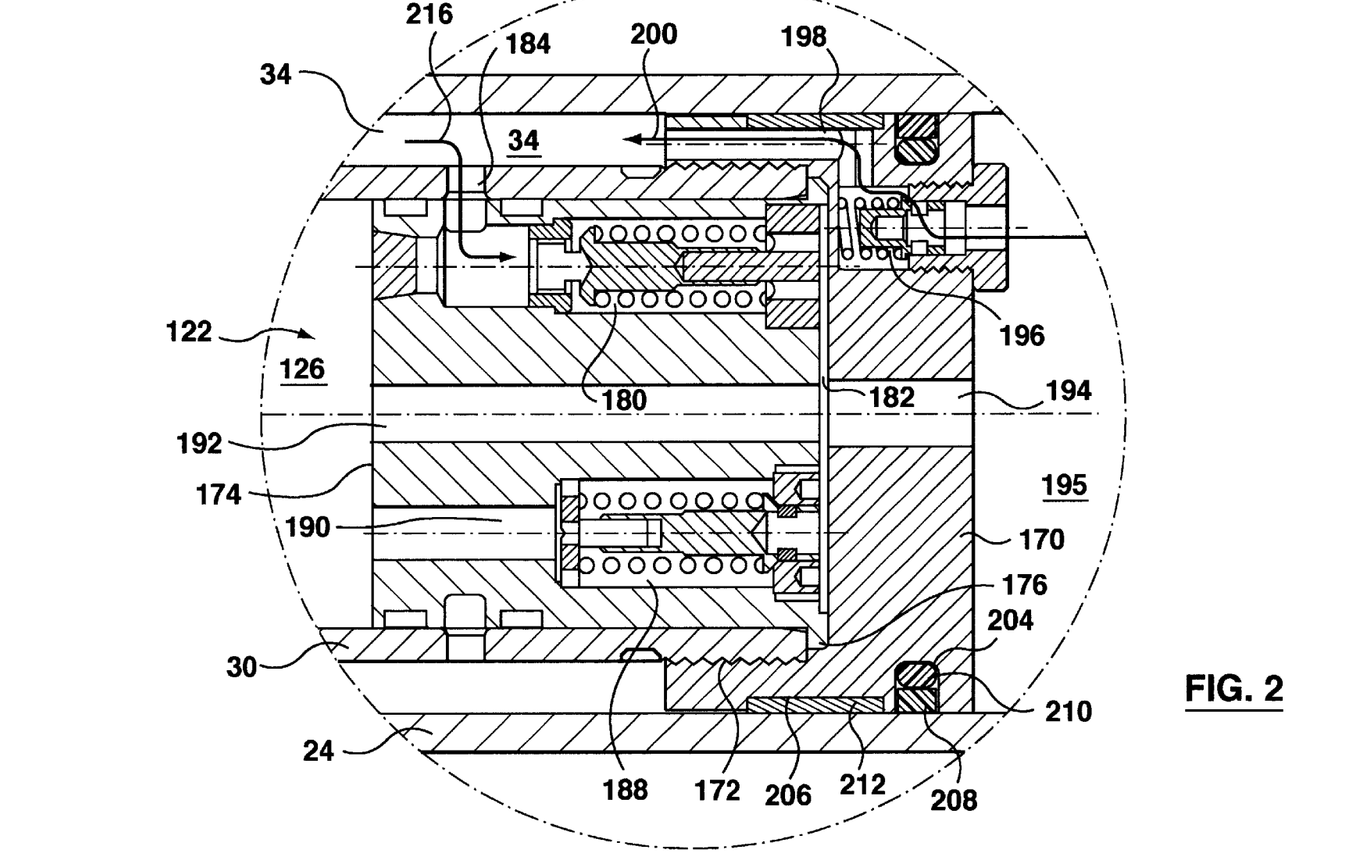
FIG. 2 shows a partial cross sectional view of the FIG. 1 suspension strut, illustrating a piston tube cap and plug.
Figure 6:
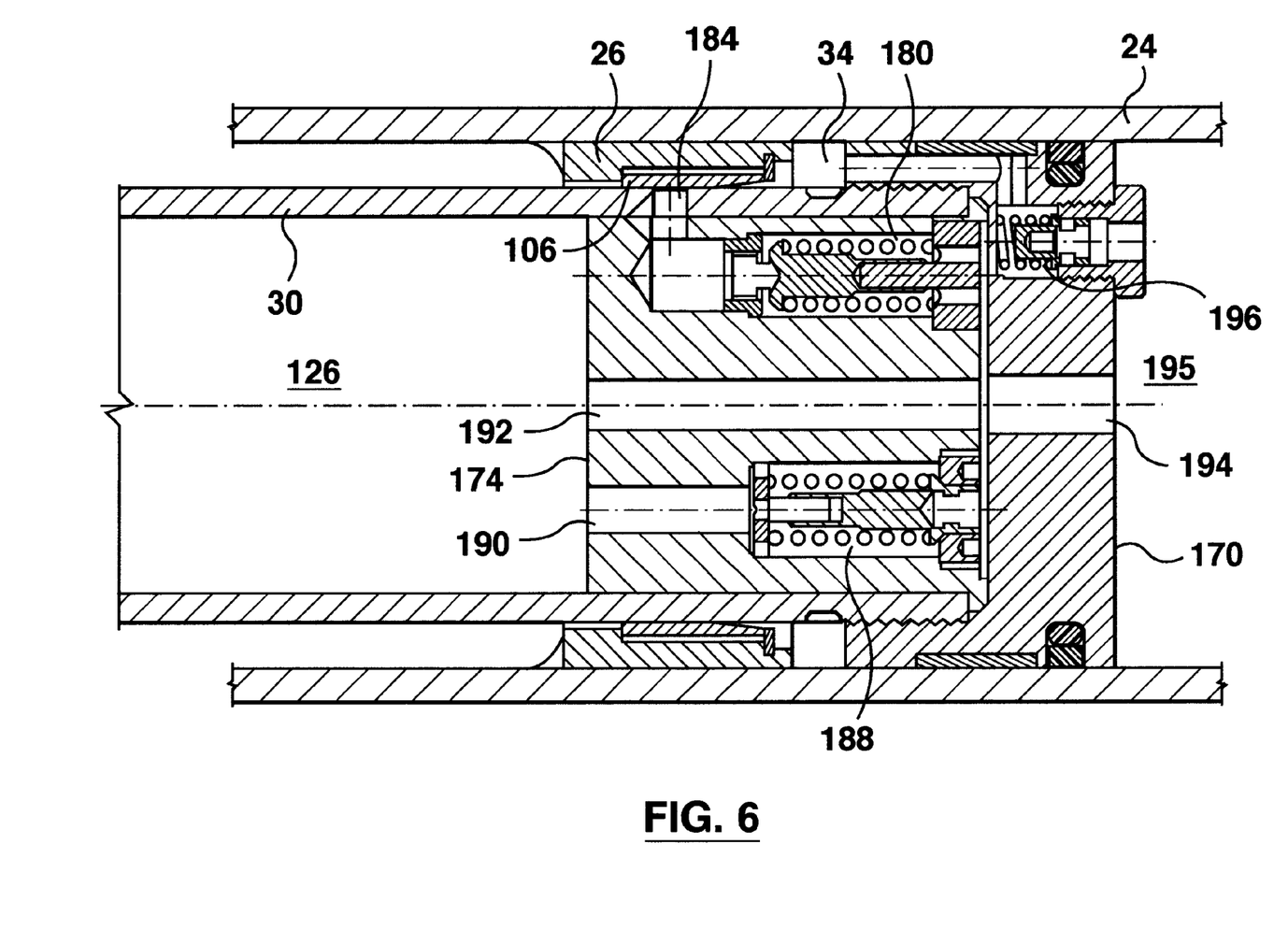
FIG. 6 is a view similar to FIG. 5 but showing a closed fluid flow path.

Piston tube 30 at its right hand end (as drawn) is fixedly mounted by thread 120 to a piston tube cap assembly indicated at 122 (see also FIGS. 2, 5, 6). Piston tube 30 also contains a conventional floating piston 124 which defines with cap assembly 122 a cavity 126 within the piston tube for high pressure fluid.

The piston tube head assembly 74 (at the left side of piston tube 30 as drawn) includes an outer end 130 and an inner end 132. Located centrally at the inner end is a bowl shaped cavity 134. Cavity 134 contains pressurized gas, typically nitrogen, which acts as a gas spring. When the strut is at rest, the pressures at cavities 195, 126 and 214 will be very close to being equal.

When the compressive force on the suspension strut is reduced, the pressure in cavity 195 will decrease, followed by that in cavity 126. Once the "stiction" at piston 124 is overcome, piston 124 will move to the right (as drawn), forcing fluid from cavity 126 to cavity 195. The gas in cavity 214 will continue to expand until its pressure is equal to the force imposed on the strut divided by the area (inner diameter) of the piston tube.

At the outer end 130 of piston tube head assembly 74 is a pivot bearing 136 which typically receives a support shaft from a vehicle (not shown). Pivot bearing 136 is slidably received in piston tube head assembly 74 and is held in place with locking rings 138 as is known in the art. A bored hole 140 which extends to the exterior of piston tube head assembly 74 from pivot bearing 136 allows grease to be pumped into the bearing for lubrication, as required.

Also located within piston tube head assembly 74 is a filler valve 142 which is used to pump or bleed gas from the cavity 134 as required. Filler valve 142 communicates between the exterior of piston tube head assembly 74 and bowl-shaped cavity 134 via bored hole 144. With the strut set at mid-stroke, the spring force in the strut is a function of the gas charge pressure. The spring rate, or rate of change of spring force as the strut is extended or collapsed, is a function of the size of cavity 214 with the strut at mid-stroke. Damping forces are produced principally by the pressure differentials across the piston head acting on the annular and bore areas, as is well known.

Figure 4:
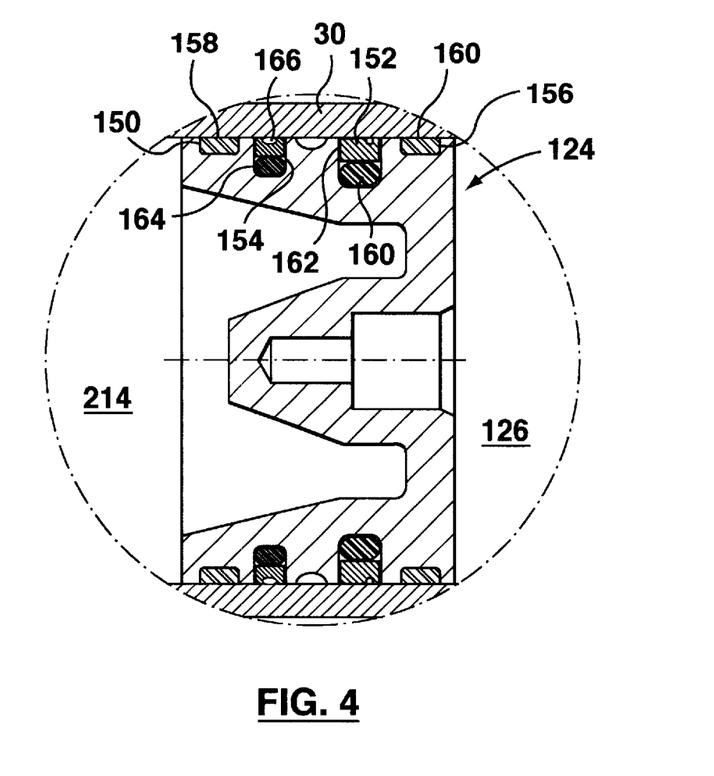
FIG. 4 is a cross sectional view of a floating piston of the FIG. 1 strut.

The floating piston 124 (see FIG. 4) includes annular channels 150, 152, 154 and 156 on its outer radial surface. Channels 150, 156 contain guide rings 158, 160 to ensure smooth axial motion of the outer radial surface of floating piston 124 on the inner radial surface of piston tube 30. Channel 152 contains an O-ring seal 160 outwardly biasing a step seal 162, while channel 154 contains an O-ring seal 164 which outwardly biases a bean seal 166. These seals prevent fluid from moving between cavities 126, 134 while at the same time allowing the floating piston 124 to travel freely within the piston tube 30 in response to displacement of the suspension strut.

Piston tube cap assembly 122 (at the right hand side of the piston tube 30 as drawn) includes (see also FIGS. 2, 5, 6) a cylindrical cap 170 which axially receives the outer radial surface of piston tube 30 on its inner annular surface and is secured thereto by thread 172. Cap assembly 170 also includes a cylindrical plug 174 which is received in the bore of piston tube 30 and is held in position by plug flange 176 which is trapped between cap 170 and the end of piston tube 30.

Plug 174 includes a first set of three axially aligned poppet valves 180 radially spaced 180° from each other. It will be appreciated that the number of poppet valves can be increased or decreased as desired. The axially outer ends of the poppet valves 180 communicate with a cavity 182 which is defined by axial spacing between plug 174 and cap 170. The inner ends of poppet valves 180 communicate with radially bored holes 184 through the wall of piston tube 30.

Also located within plug 174 is a second set of three poppet valves 188 which are axially aligned and spaced 120° from each other. Poppet valves 188 are each located 60° apart from poppet valves 180. The outer ends of poppet valves 188 communicate with cavity 182, while the inner ends of poppet valves 188 communicate with axially bored holes 190 in plug 174. The holes 190 in turn communicate with the cavity 126 in piston tube 30.

Plug 174 also includes a bored hole 192 along its central axis. Bored hole 192 allows fluid communication between cavities 126 and 182. Similarly, cap 170 includes a bored hole 194 along its central axis. Bored hole 194 allows communication between cavity 182 and a cavity 195 in the cylinder tube 24 at the right-hand side of cap 170. Cavity 195 is adjacent cavity 50.

Cap 170 also includes six compression check valves 196 which are axially aligned and radially spaced 60° from each other. Compression check valves 196 communicate with cavity 195 at their outer ends, and with annular cavity 34 at their inner ends, by channel 198 as is shown in FIG. 2. When the suspension strut 20 is placed in compression, fluid can flow from cavity 50 to annular cavity 34 via the flow path indicated by arrow 200 in FIG. 2. However, when the suspension strut is being extended, fluid cannot flow through the compression check valves 196 from annular cavity 34 to cavity 50 since compression check valves 196 allow only one way flow, as is known in the art.

Cap 170 also includes (see FIG. 2) two annular channels 204, 206 on its outer radial surface. Channel 204 contains an outer T-ring seal 208 and an inner O-ring seal 210 to place outward pressure on the T-ring seal 208. These seals prevent fluid from moving between cavities 34, 195 by travelling between the outer radial surface of cap 170 and the inner radial surface of cylinder tube 24.

Annular channel 206 contains a guide ring 212 which can be made of Teflon™ or nylon. Guide ring 212 ensures smooth axial movement between the inner radial surface of cylinder tube 24, and cap 170.

The operation of the strut is as follows:

In Extension

With reference to FIG. 1, which shows the strut 20 in maximum compression, it will be seen that as the compressive force on the strut decreases, gas contained within cavity 134 and in the piston tube at the left of floating piston 124 (indicated as cavity 214) can expand (since the gas will now be under higher pressure than the fluid within cavity 126). As the gas expands, floating piston 124 will be driven towards cylinder tube head 42, expelling fluid from piston tube cavity 126 into cavities 182, 195 and 50 via two different flow paths. Along one path, the fluid will flow through plug bore 192 into cavity 182, and through bore 194, before reaching cavities 195 and 50. Along the second path, fluid will flow through poppet valves 188, into cavity 182, and through bore 194, before reaching cavities 195 and 50.

As the fluid enters cavities 195 and 50, it will place an outward force on cylinder tube head 42 which will drive cylinder tube head 42 and piston tube head 74 away from each other. Consequently, collar 26 will move towards piston tube cap 170 which will reduce the volume of annular cavity 34. This will force fluid to move from annular cavity 34 through bores 184, through poppet valves 180, into cavity 182, through the bored hole 194 and into cavities 195 and 50 as indicated by the arrow 216 in FIGS. 2 and 5.

Eventually, strut 20 will be in equilibrium when the force exerted by the gas spring on the fluid in cavity 126 is equivalent to the compressive force being applied to the strut by the vehicle.

If the compressive force on the suspension strut 20 is reduced sufficiently, collar 26 will continue to travel towards piston tube cap 170. Eventually, the tapered end 108 of floating wear band 106 will begin to overlap bored holes 184. This will restrict fluid flow through bored holes 184 which will effectively slow the movement of hydraulic fluid from annular cavity 34 into cavities 182, 195 and 50. As the flow of hydraulic fluid from cavity 34 into cavities 182, 195 and 50 is reduced, the pressure within annular cavity 34 will increase such that the force exerted on the end wall of the collar 26 (including the floating wear band 106) will approach the force applied to the cylinder tube head 42 via the gas spring. This will increase the damping within the strut 20 and will slow the expansion of the strut.

If the compressive force on the strut 20 is further reduced, the thick end 110 of the floating wear band 106 will begin to seal bored holes 184, further increasing the damping effect. Eventually the bored holes 184 will be entirely sealed by the thick portion of the floating wear band 106 (see FIG. 6), causing cylinder tube head 42 to stop moving with respect to the collar 26. Extension of the strut will cease since the force on collar 26 exerted by the fluid in annular cavity 34 will be equivalent to the force exerted by the gas spring on cylinder tube head 42.

It will be appreciated that the gradual increase in damping that occurs as the suspension strut approaches full extension has several advantages. Firstly, metal to metal contact between the piston tube cap 170 and the collar 26 is avoided, which increases the durability of the strut and makes the vehicle operation smoother and quieter. Secondly, reduced loads are transferred to the bearings, which will prolong their useful life.

Of course, other techniques can be used to achieve increased damping as the suspension strut approaches full extension, and which are within the spirit of the invention. For instance, the increased damping can be achieved (see FIG. 7) by having a wear band 106' with uniform thickness slide over a tapered channel 220 in the piston tube 30. The channel 220 can be deepest towards its inner axial end and shallowest towards its outer axial end such that as the wear band 106' slides over the channel 220, damping will gradually increase. Increased damping occurs because the area through which the fluid travels from annular cavity 34 through bores 182' will be decreased, which will increase the pressure within annular cavity 34.

Figure 7:
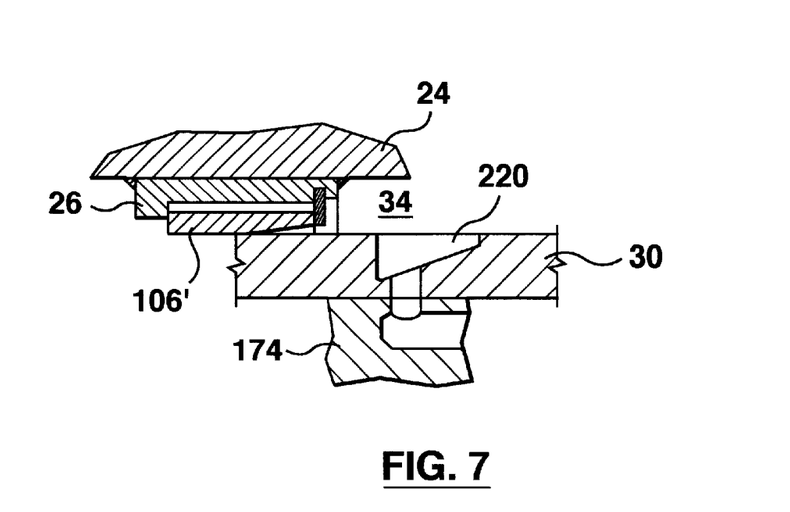
FIG. 7 shows detail of a second embodiment of the suspension strut of the invention with grooved channels in the piston tube.
Figure 8:
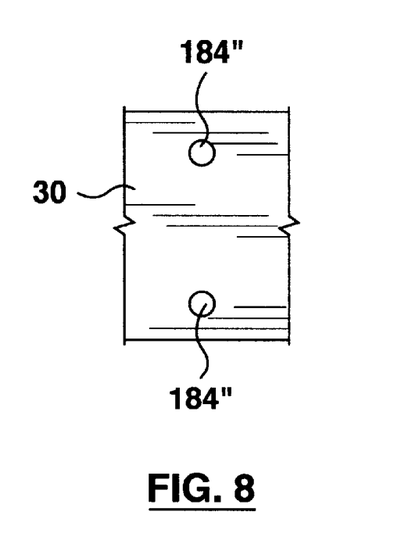
FIG. 8 is a plan view of a portion of the piston tube of FIG. 1 showing round orifices in the piston tube wall.
Figure 9:
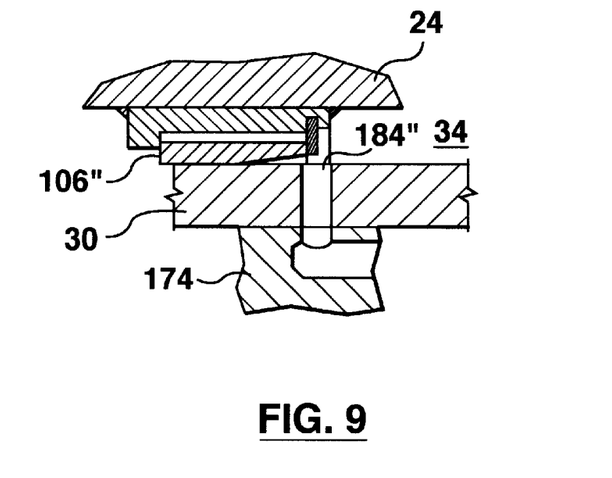
FIG. 9 is a cross sectional view showing another embodiment of the suspension strut of the invention, using round orifices in the piston tube with a straight wear band.

As another alternative, and as shown in FIGS. 8 and 9, a straight, untapered wear band 106" can be used (as also shown in FIG. 7), in cooperation with a round drilled hole 184" in the piston tube wall. This combination will also produce a graduated shutoff of fluid flow from annular cavity 34 through the poppet valves 180. In fact, it is found that because of restrictions to fluid flow in the poppet valves which are in series with flow through holes 184", little or no additional damping effect occurs from the wear band 106" covering the holes 184" until (for example, with 6 mm diameter holes 184") the holes 184" are approximately half-covered by the wear band 106". It should also be realized that even when the holes 184" are fully covered by the untapered wear band 106" and in fact until the front edge of the wear band is several millimetres or more beyond the front edge of the holes 184", some fluid will flow through the clearance (typically 0.01 to 0.025 mm) between the wear band 106" and the outer surface of piston tube 30. Of course fluid friction losses increase as the wear band covers the holes 184", until eventually fluid flow is cut off.

It will be realized that the damping characteristics of the strut as the wear band covers the holes in the piston tube wall may be tailored as desired, by selecting appropriately the shape of the wear band (straight, or with a desired degree of taper), and by selecting the shape of the holes 184 (which can be round, or axially or even circumferentially elongated, and of a desired depth profile in axial and radial cross section).

In Compression

Figure 3:
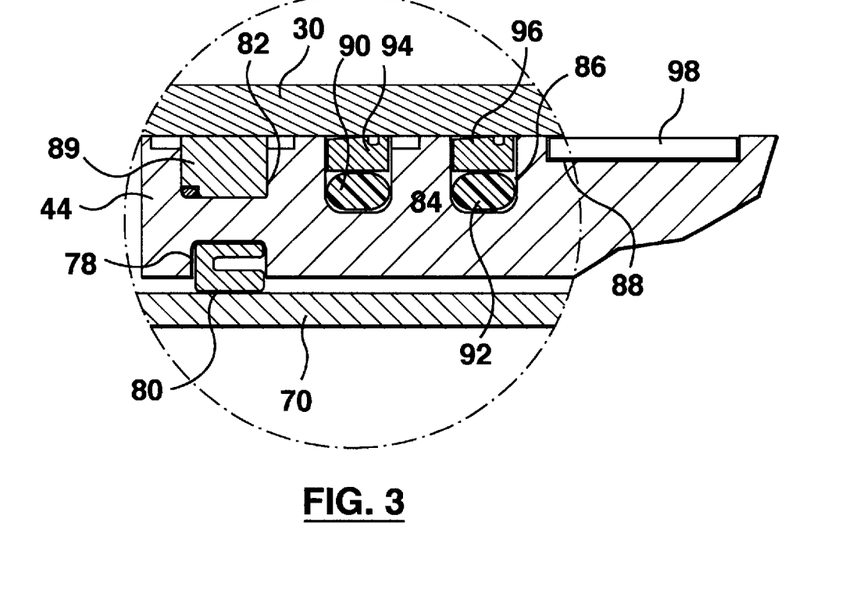
FIG. 3 is a cross sectional view showing detail at one end of the cylinder tube.

Assuming that the compression strut 20 is in a fully extended state as shown in FIG. 3, and a compression force is applied to the strut, fluid will flow from cavities 50 and 195 through bored hole 194 and into cavity 182. From cavity 182, the fluid can flow either through plug bored hole 192 into piston tube cavity 126, or through poppet valves 188 into bored holes 190 and then into cavity 126. Simultaneously, fluid will also travel from cavities 50 and 195, through compression check valves 196, and into annular cavity 34 via channels 198. As the gas spring cavity reduces in size, eventually the force exerted by the gas spring on. floating piston 124 will be equivalent to the compressive pressure on the strut. These equal and opposite forces will stop further compression of the strut. Assuming that the compressive force on the strut is sufficient to fully compress the strut, metal to metal contact can occur depending on the pressure in the gas spring.

It will be understood that preferred embodiments of the invention have been described, and that changes and alternative embodiments can be made within the spirit of the invention as described above.

I claim:

1. A suspension strut comprising:
   (a) an outer cylinder having an inner surface;
   (b) an inner cylinder defining a first space therein, said inner cylinder being slidable in said outer cylinder and defining an annular second space between said inner cylinder and said outer cylinder;
   (c) said inner cylinder including a cap assembly defining a third space between said cap assembly and said outer cylinder;
   (d) at least one valve on said inner cylinder to permit fluid flow between said annular second space and said third space; and
   (e) a shutoff attached to the inner surface of said outer cylinder and cooperating with said valve to effect a gradual shutoff of fluid flow from said annular second space through said valve to said third space as said inner and outer cylinders are extended with respect to each other.

2. The suspension strut of claim 1 wherein said shutoff comprises a collar fixed to the inner surface of said outer cylinder, said collar having an inner surface and an annular recess in said inner surface.

3. The suspension strut of claim 2 wherein said shutoff includes a wear band, said wear band being located in said recess in said collar.

4. The suspension strut of claim 3 wherein said wear band is tapered.

5. The suspension strut of claim 3 wherein said wear band is of uniform thickness.

6. The suspension strut of claim 4 or 5 wherein said shutoff includes a retaining ring for maintaining said wear band in said recess of said collar.

7. The suspension strut of claim 3 wherein said inner cylinder includes a cylindrical outer surface, said at least one valve having a fluid flow orifice located in said outer surface of said inner cylinder in a position such that said wear band moves over and covers said orifice as said inner and outer cylinders are extended with respect to each other, thereby achieving said gradual shutoff.

8. The suspension strut of claim 7 wherein said orifice is round in plan view.

9. The suspension strut of claim 7 wherein said orifice is elongated in an axial direction.

10. The suspension strut of claim 1 and including a floating piston located in said inner cylinder.

11. The suspension strut of claim 10 and including a gas spring associated with said floating piston.

12. The suspension strut of claim 1 and including at least one further valve in said cap assembly to regulate fluid flow between said first space and said third space.

13. The suspension strut of claim 1 further comprising at least one still further valve associated with said cap assembly to regulate fluid flow from said third space to said second space.

* * * * *